S. J. Gillham, W. C. Taylor and J. W. Stolle's

Gang-Plow.

116428

PATENTED JUN 27 1871

Inventors
Samuel J. Gillham
William Capp Taylor
James W. Stolle
By Wright Bros. Attys.

Attest.
Wm. L. Brereton Jr.
Walter Allen

UNITED STATES PATENT OFFICE.

SAMUEL J. GILLHAM, WILLIAM CAPP TAYLOR, AND JAMES W. STOLLE, OF VANDALIA, ILLINOIS, ASSIGNORS TO SAID GILLHAM AND TAYLOR.

IMPROVEMENT IN GANG-PLOWS.

Specification forming part of Letters Patent No. 116,428, dated June 27, 1871.

*To all whom it may concern:*

Be it known that we, SAMUEL J. GILLHAM, WILLIAM CAPP TAYLOR, and JAMES W. STOLLE, of Vandalia, Fayette county, Illinois, have invented a certain new and useful Improved Gang-Plow, of which the following is a specification:

The plow-standards are pivoted to the beams and connected by screw-brace rods to a pivoted screw-block or nut hung to the beams, the screw-blocks being connected by forked rods to bolts passing through the axle-bar, and serving, also, to attach thereto vertical guide-yokes, through which the beams pass. The fore ends of the beams are hinged by eye-bolts to the fore bar of the wheel-frame. The beams are connected by shackles or links to the arms of a rock-bar, operated by a hand-lever or treadle, to raise the plows from the ground. The plow-beams and guide-yokes are laterally adjustable on the frame by series of holes for their attaching-bolts. The rear end of the tongue is pivoted to the axle-bar, and has lateral adjustment on the fore bar of the frame by means of a slot, through which its attaching-bolt passes.

Figure 2:
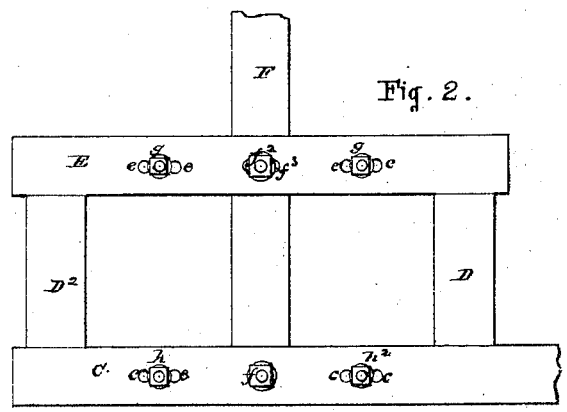
Figure 1:
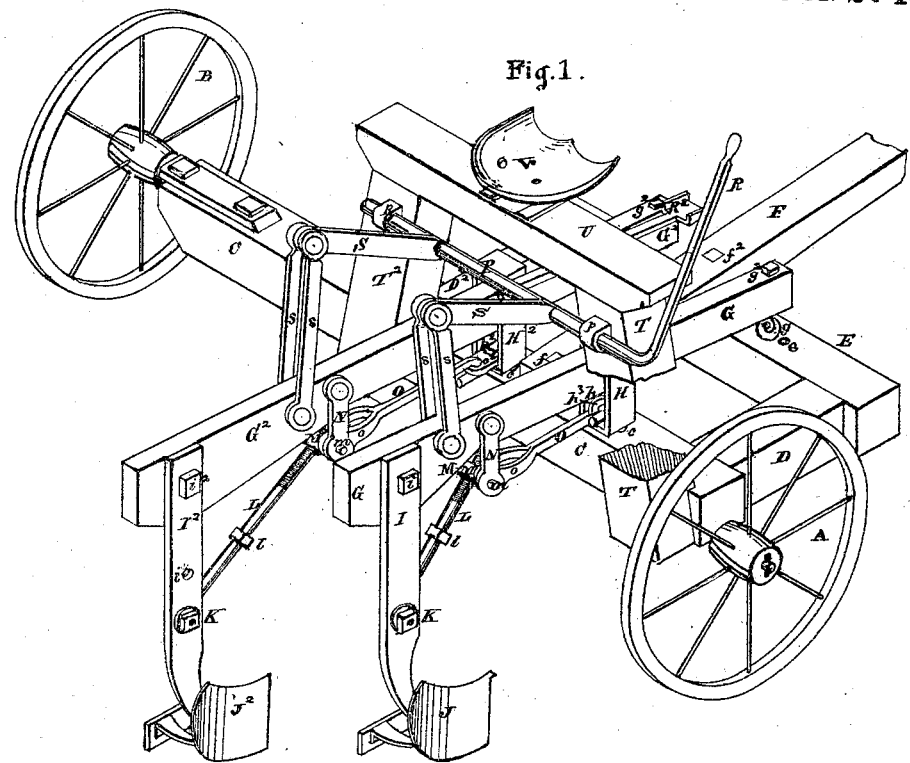
Figure 3:
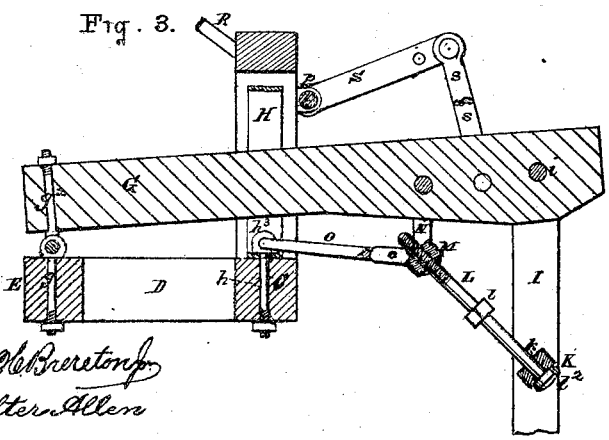

Figure 1 is a perspective view of our gang-plow. Fig. 2 is a bottom plan of a portion of the wheel-frame, showing the adjusting-holes and slot of the beams and tongue. Fig. 3 is a longitudinal section through one of the beams, showing its connections.

A B are the wheels, turning on spindles, connected the one to the under side and the other to the upper side of the axle-bar C. The wheel A, whose spindle is connected to the under side of the axle-bar, runs in the furrow, the wheel B running upon the unplowed land, and thus the axle-bar is held about horizontally. D $D^2$ are the side bars, and E the fore bar of the wheel-frame. F is the tongue, whose rear end is pivoted to the axle-bar by a single bolt, $f$, and which is adjustably attached to the fore bar by a bolt, $f^2$, passing through a slot, $f^3$, in the fore bar E. By the inclination of the tongue the plows are made to turn a greater or smaller breadth of land; or the plow may be made to operate as a "sub-soiler" by setting it so that the forward plow will run in the furrow left by the rear plow on its previous round, the rear plow being fixed at a higher level than the fore plow. The fore bar E has two series of vertical holes, $e$, to receive the eye-bolts $g$, which, with similar eye-bolts $g^2$ passing through the fore ends of the beams, form the hinges connecting said beams and bar. G $G^2$ are the beams, extending backward through guide-yokes H $H^2$, adjustably attached to the axle-bar by bolts $h$ $h^2$ passing through any of the holes $c$ therein. These yokes, while permitting the vertical motion of the beams, prevent their side movement, and also prevent their twisting. I $I^2$ are the plow-standards, pivoted by bolts $i$ $i^2$ to the rear ends of the beams. J $J^2$ are the plows proper. K are socket-bolts passing through the standards and having sockets $h$, in which turn the rear ends of the brace-rods L, whose screw-threaded portion turns in a nut-block, M, having gudgeons, $m$, passing through the links N, by which it is supported upon the beam. The gudgeons $m$ also pass through the forked end $o$ of a rod, O, whose fore end is hooked in an eye, $h^3$, at the upper end of the bolt $h$, or through an eye in a plate, $o^2$, secured by the bolt $h^2$. P is a rock-bar, turning in brackets $p$, and operated by a lever, R, or a treadle, $R^2$. S are arms connected by links $s$ to the beams, so that, as the lever or treadle is forced forward or downward, the plows are raised, enabling the implement to be easily turned around or moved from place to place. T $T^2$ are posts whose upper ends are connected by a cross-bar, U, supporting a seat, V, part of the post T being broken away to show parts behind it. The beam $G^2$ is longer than that G, so that the plow upon the former is always sufficiently in the rear to cast no dirt upon the other plow.

When using the plow in sub-soiling, the bolt $i^2$ is passed through the hole $i^3$ so as to raise the plow $J^2$, which is made to turn the upper furrow while the plow J turns up the subsoil laid bare by the plow $J^2$ in the previous "round."

The depth to which the plows run is regulated by the screw brace-rods L, the point of the plows being raised or lowered by turning the said rods, by means of the squared portions $l$, the heads $l^2$ of the said rods engaging beneath the socket-bolts K.

We claim as our invention—

1. The adjustable hinge-connection $e\ g\ g^2$, between the fore ends of the beams and the frame, in combination with the guide-yokes $H\ H^2$, connected to the axle-bar by adjustable socket-bolts $h$, substantially as and for the purposes set forth.

2. The adjustable brace-connection $K\ k\ L\ l\ M\ N\ O\ h$, in combination with the beam G, standard I, and axle C, substantially as set forth.

In testimony of which invention we have hereunto set our hands.

SAMUEL J. GILLHAM.
WM. CAPP TAYLOR.
JAMES W. STOLLE.

Witnesses:
HENRY F. GERAULD,
J. N. McCORD.